(12) United States Patent
Tsai (10) Patent No.: US 8,736,928 B2
(45) Date of Patent: May 27, 2014

(54) AUTOMATIC DOCUMENT FEEDING SCANNING DEVICE

(71) Applicant: Primax Electronics Ltd., Taipei (TW)

(72) Inventor: Shang-Hsien Tsai, Taipei (TW)

(73) Assignee: Primax Electronics Ltd., Neihu (TW)

( * ) Notice: Subject to any disclaimer, the term of this patent is extended or adjusted under 35 U.S.C. 154(b) by 0 days.

(21) Appl. No.: 13/753,911

(22) Filed: Jan. 30, 2013

(65) Prior Publication Data

US 2014/0092448 A1  Apr. 3, 2014

(30) Foreign Application Priority Data

Sep. 28, 2012 (TW) ................................. 101135811

(51) Int. Cl.
*H04N 1/04* (2006.01)

(52) U.S. Cl.
USPC ............ 358/498; 358/497; 358/496; 358/474

(58) Field of Classification Search
USPC .................. 358/498, 497, 496, 474
See application file for complete search history.

(56) References Cited

U.S. PATENT DOCUMENTS

2004/0217537 A1* 11/2004 Ohama ........................ 271/3.14
2009/0085280 A1*  4/2009 Litman et al. ................ 271/186

* cited by examiner

*Primary Examiner* — Houshang Safaipour
(74) *Attorney, Agent, or Firm* — Kirton McConkie; Evan R. Witt (57) ABSTRACT

The present invention discloses a sheet feed scanner including an auto document feeder, a flatbed scanner and a power-switching mechanism. The power-switching mechanism includes a first shaft, a power source, a clutch, a first gear, a second gear, and an elastic limitation structure. The clutch includes a first incline and a second incline. The elastic limitation structure pushes the first incline or the second incline of the clutch. When the first shaft is rotated in a first direction, the first incline is pushed by the elastic limitation structure so that the clutch is coupled to the first gear for driving the automatic document feeder. When the first shaft is rotated in a second direction, the second incline is pushed by the elastic limitation structure so that the clutch is coupled to the second gear for driving the flatbed scanner.

8 Claims, 13 Drawing Sheets

AUTOMATIC DOCUMENT FEEDING SCANNING DEVICE

FIELD OF THE INVENTION

The present invention generally relates to a power-switching mechanism, and more particularly to a power-switching mechanism capable of switching to transmit a power to an auto document feeder or to a flatbed scanner.

BACKGROUND OF THE INVENTION

Figure 1:
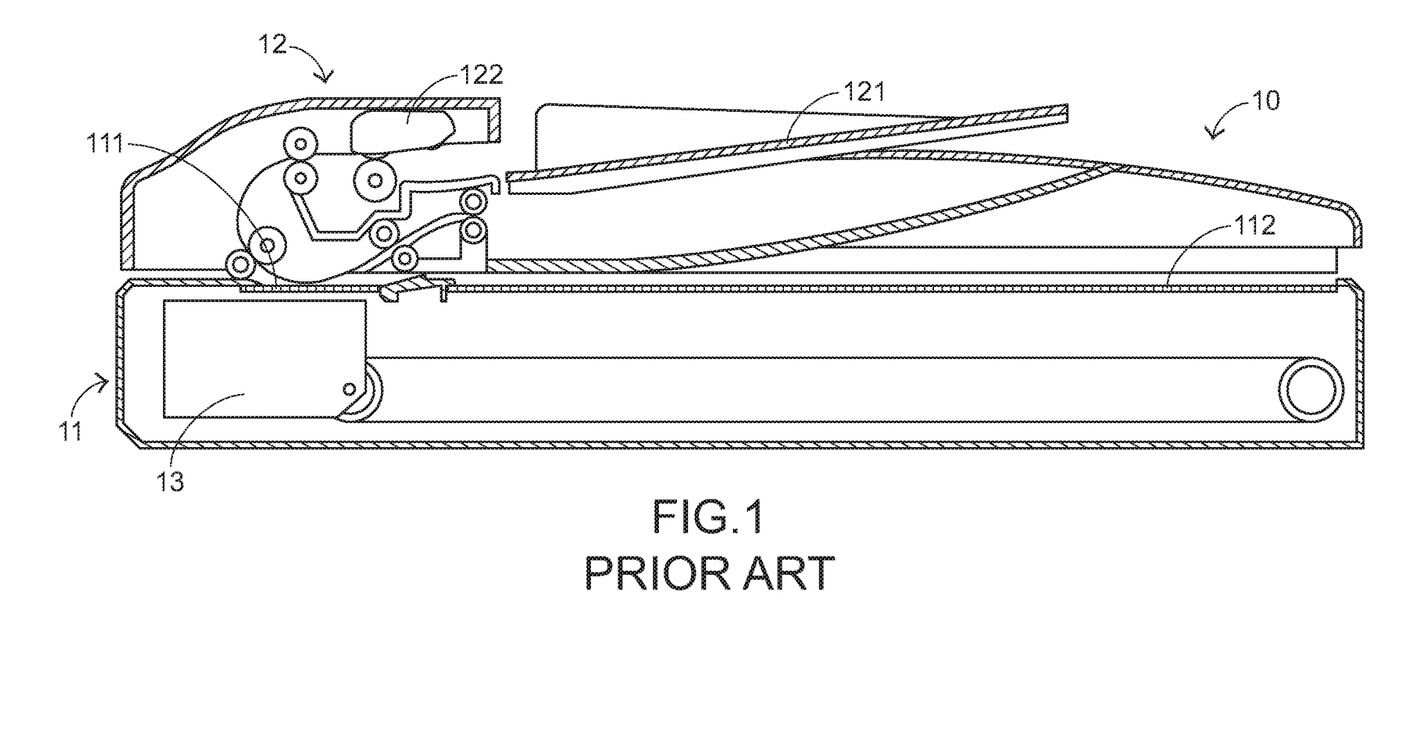
FIG. 1 illustrates a schematic view of a conventional sheet feed scanner.

In order to enhance the efficiency for scanning the document and to miniaturize the machine, most of the present sheet feed scanners integrate with both of an auto document feeder and a flatbed scanner as a single machine, so as to enable the sheet feed scanners to have both of a function of a conventional flatbed scanner and a function of a conventional document feeding scanning process. Referring to FIG. 1, FIG. 1 illustrates a schematic view of a conventional sheet feed scanner. As shown in FIG. 1, the sheet feed scanner 10 includes a flatbed scanner 11 and an auto document feeder 12, wherein the auto document feeder 12 is disposed over the flatbed scanner 11.

The flatbed scanner 11 comprises a scanning window 111, a scanning platform 112, a scanning module 13 and a first power source (not shown), wherein the scanning module 13 is disposed under both of the scanning window 111 and the scanning platform 112, and the first power source is capable of driving the scanning module 13. When a document is disposed on the scanning platform 112, the first power source drives the scanning module 13 to move, so as to scan the document.

The auto document feeder 12 comprises a receiving tray 121, a pickup arm 122 and a second power source (not shown), wherein the receiving tray 121 is capable of receiving a document desired to be scanned, while the second power source is capable of driving the pickup arm 122 to rotate, so as to enable the pickup arm 122 to feed the document into the auto document feeder 12. After the document is fed into the auto document feeder 12, the document passes through the scanning window 111 of the flatbed scanner 11, and thus the scanning module 13 located under the scanning window 111 is capable of scanning the document.

According to the foregoing descriptions, in the conventional sheet feed scanner, the flatbed scanner and the auto document feeder individually connect with different power sources. As a result, the sheet feed scanner can drive at least one of the flatbed scanner and the auto document feeder by activating different power sources based upon different scanning requirements. However, in order to assemble with a plurality of power sources, not only a total volume of the sheet feed scanner is significantly increased, but also a total cost of the sheet feed scanner is significantly increased, and thus a competitiveness of such a product is accordingly reduced.

SUMMARY OF THE INVENTION

The present invention is directed to providing a power-switching mechanism with lower cost.

In a preferred embodiment, the present invention provides a sheet feed scanner capable of scanning a document, wherein the sheet feed scanner comprises:
an automatic document feeder, capable of feeding the document, wherein the automatic document feeder comprises;
a top cover;
a pickup arm, disposed under the top cover and capable of swinging relative to the top cover, so as to feed the document into the auto document feeder; and
a feeding gear, connecting with the pickup arm;
a flatbed scanner, disposed under the auto document feeder, and capable of scanning the document, wherein the flatbed scanner comprises:
a scanning module, capable of reading an image of the document;
a scanning module gear, connecting with the scanning module; and
a stopping structure, capable of stopping the scanning module from moving;
a power-switching mechanism, capable of transmitting a driving power to the auto document feeder or the scanning module, wherein the power-switching mechanism comprises:
a first shaft, comprising a protrusion portion;
a power source, capable of driving the first shaft to rotate;
a clutch, fitting onto the first shaft, and comprising a sliding groove, a first incline and a second incline, wherein the protrusion portion is disposed to the sliding groove, so as to enable the clutch to shift relative to the first shaft;
a first gear, fitting onto the first shaft, and disposed at a side of the clutch;
a second gear, fitting onto the first shaft, and disposed at another side of the clutch; and
an elastic limitation structure, pushing the first incline or the second incline of the clutch, wherein the stopping structure generates a first reaction force to the scanning module when the scanning module moves toward the stopping structure to contact with the stopping structure, so as to enable the clutch to disengage from the second gear, while the top cover generates a second reaction force to the pickup arm when the pickup arm swings upward to contact with the top cover, so as to enable the clutch to disengage from the first gear.

In a preferred embodiment, the power source is a motor.

In a preferred embodiment, the elastic limitation structure comprises a push rod and a spring, wherein the spring is disposed at a rear end of the push rod.

In a preferred embodiment, the elastic limitation structure comprises a pressure roller, a holding rod and a spring, wherein the pressure roller passes through a front end of the holding rod, and the spring is disposed at a rear end of the holding rod.

In a preferred embodiment, the feeding gear is coupled to the first gear when the elastic limitation structure pushes the first incline of the clutch, while the scanning module gear is coupled to the second gear when the elastic limitation structure pushes the second incline of the clutch.

In a preferred embodiment, each one of the second gear and the scanning module gear is a bevel gear.

In a preferred embodiment, the clutch further comprises a first interference portion and a second interference portion, the first gear comprises a third interference portion, and the second gear comprises a fourth interference portion, wherein the first interference portion of the clutch is coupled to the third interference portion of the first gear, and the second interference portion of the clutch is coupled to the fourth interference portion of the second gear.

In a preferred embodiment, each one of the first interference portion, the second interference portion, the third interference portion and the fourth interference portion comprises a plurality of teeth, wherein each one of the teeth has a longer edge and a shorter edge, and an acute angle is formed by the longer edge and the shorter edge.

DETAILED DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 2:
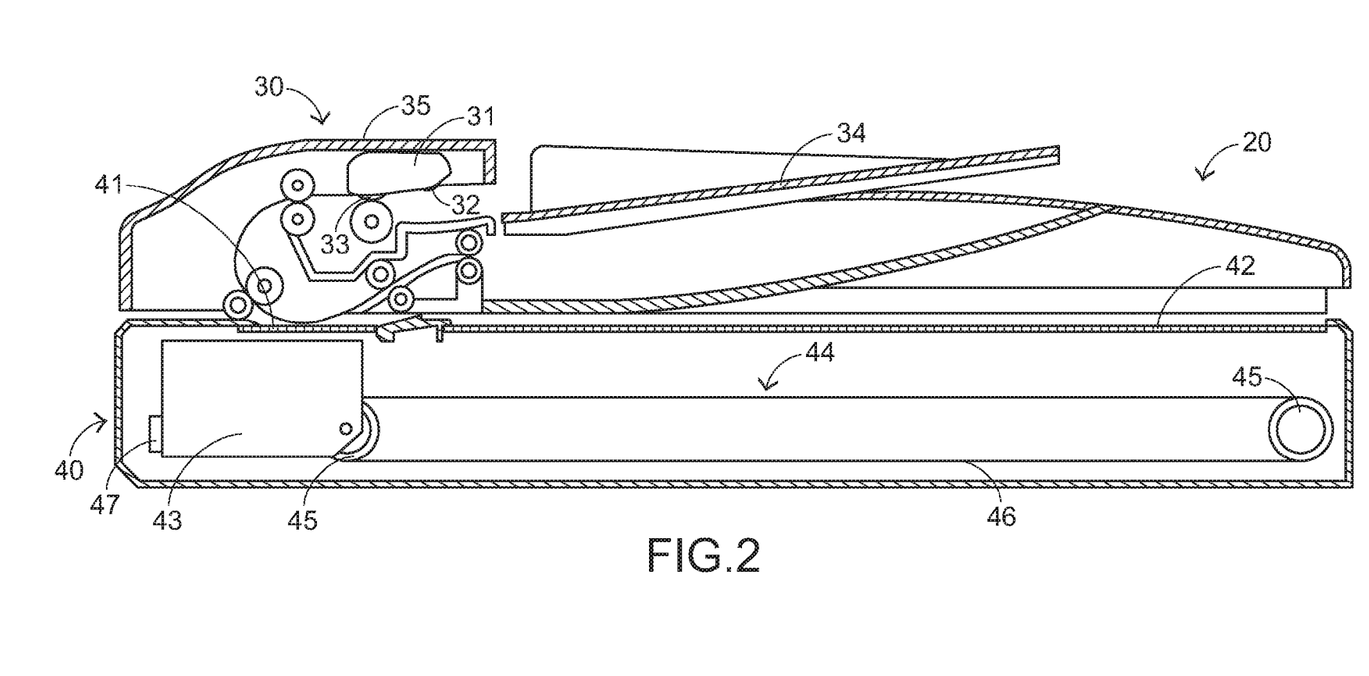
FIG. 2 illustrates a schematic view of a sheet feed scanner according to a preferred embodiment of the present invention.
Figure 3:
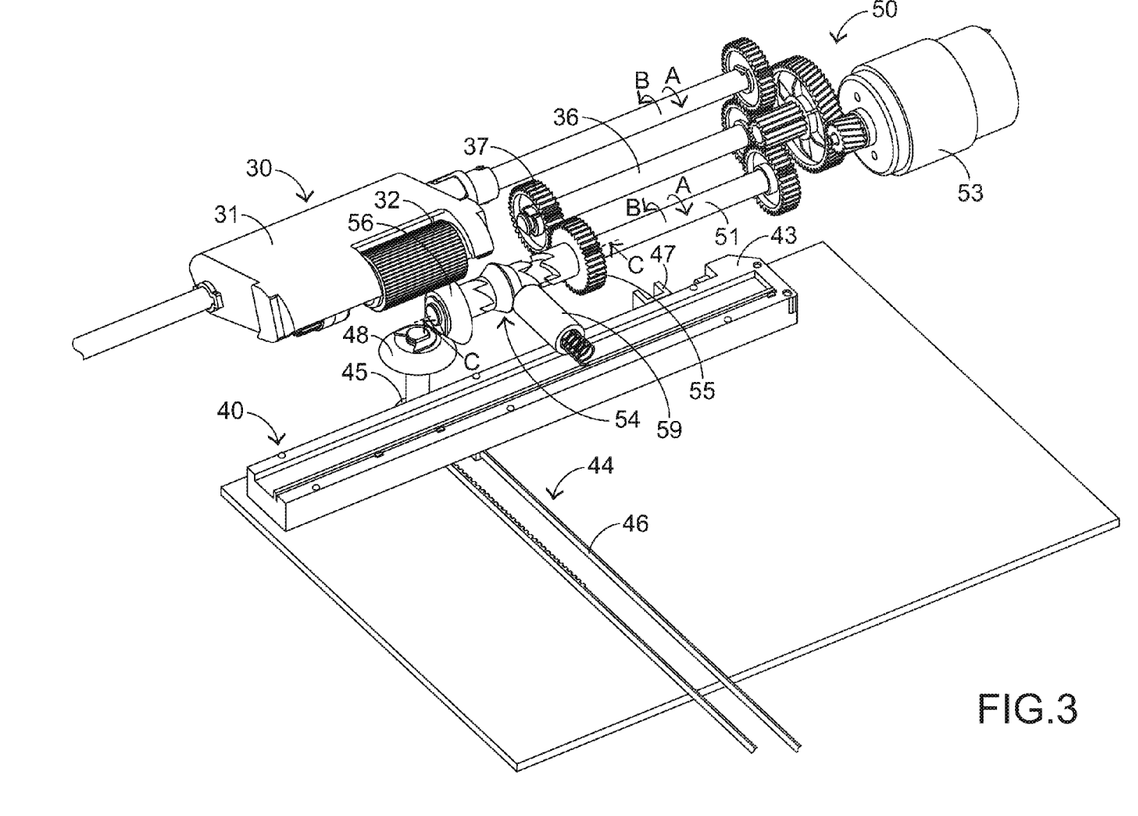
FIG. 3 illustrates a schematic view of a power-switching mechanism according to a first preferred embodiment of the present invention.

The power-switching mechanism provided by the present invention can be applied to a sheet feed scanner. The sheet feed scanner comprises an auto document feeder and a flatbed scanner, wherein the auto document feeder is capable of feeding documents, while the flatbed scanner is capable of scanning the documents. Further, the sheet feed scanner can be but is not limited to a traditional sheet feed scanner or a multifunctional business machine. Referring to FIG. 2, FIG. 2 illustrates a schematic view of a sheet feed scanner according to a preferred embodiment of the present invention. In addition, referring to FIG. 3, FIG. 3 illustrates a schematic view of a power-switching mechanism according to a first preferred embodiment of the present invention. As illustrated in FIG. 2 and FIG. 3, the sheet feed scanner 20 comprises an auto document feeder 30, a flatbed scanner 40 and a power-switching mechanism 50, wherein the detail components and the operations of the power-switching mechanism are illustrated later. The auto document feeder 30 comprises a pickup arm 31, a pickup roller 32, a separation roller 33, a receiving tray 34, a top cover 35, a second shaft 36 and a feeding gear 37. Moreover, the top cover 35 is an upper case of the auto document feeder 30. Besides, the pickup arm 31 is disposed under the top cover 35, and capable of swinging relative to the top cover 35, so as to feed the documents into the auto document feeder 30.

The pickup roller 32 is disposed at a front side of the pickup arm 31, and capable of feeding the documents put on the receiving tray 34. Moreover, the separation roller 33 is disposed at a rear side of the pickup arm 31, and capable of separating the documents fed by the pickup roller 32, so as to prevent from double feeding. In addition, the receiving tray 34 is capable of carrying the documents. Furthermore, the feeding gear 37 is fixed to the second shaft 36, and thus capable of transmitting a driving power to the pickup arm 31. Since the detail structures of the auto document feeder 30 are substantially the same as those of the conventional auto document feeders, the detail structures are omitted herein.

The flatbed scanner 40 comprises a scanning window 41, a scanning platform 42, a scanning module 43, a transmission mechanism 44, a stopping structure 47 and a scanning module gear 48. Herein, the scanning window 41 is located on a document feeding path of the auto document feeder 30. In addition, the document passing through the scanning window 41 will be scanned by the scanning module 43 when the document is fed into the auto document feeder 30. Moreover, the scanning platform 42 is located at a side of the scanning window 41, and capable of carrying the document. Furthermore, the scanning module 43 is disposed under both of the scanning window 41 and the scanning platform 42, and capable of capturing an image of the document. In the present preferred embodiment, the scanning module 43 can be, for example but not limited to, a contact image sensor (CIS), a charge-couple device (CCD) or any other conventional optic sensors well known by those of ordinary skilled in the art.

Besides, the transmission mechanism 44 is disposed under the scanning module 43, and capable of driving the scanning module 43 to shift rightward or leftward. Further, the scanning module gear 48 connects with the transmission mechanism 44, and is capable of transmitting a driving power to the scanning module 43. Furthermore, the transmission mechanism 44 comprises a plurality of pulleys 45 and a belt 46, wherein the pulleys 45 are disposed at two ends of the belt 46, and capable of bringing the belt to rotate. In addition, the belt 46 connects a lower portion of a lower portion of the scanning module 43, and is capable of driving the scanning module 43 to shift. Moreover, the stopping structure 47 is disposed at a side of the scanning platform 42. As a result, the belt 46 can drive the scanning module 43 to shift from a side of the scanning platform 42 to another side of the scanning platform 42 when the document is put on the scanning platform 42, so as to scan the document. Besides, after the document is completely scanned, the scanning module 43 is shifted from the another side of the scanning platform 42 to the side of the scanning platform 42 and contacts with the stopping structure 47. Since the detail structures of the flatbed scanner 40 are substantially the same as those of the conventional flatbed scanners, the detail structures are omitted herein.

A first preferred embodiment of the present invention is illustrated as below. As illustrated in FIG. 3, the power-switching mechanism 50 comprises a first shaft 51, a power source 53, a clutch 54, a first gear 55, a second gear 56 and an elastic limitation structure 59.

Here, the power source 53 connects with an end of the first shaft 51, and is capable of driving the first shaft 51 to rotate along a first direction A or a second direction B. In the present preferred embodiment, the power source 53 is, for example but not limited to, a motor.

In addition, the clutch 54, the first gear 55 and the second gear 56 respectively fit onto the first shaft 51. Herein, the first gear 55 is disposed at a side of the clutch 54, and the second gear 56 is disposed at another side of the clutch 54. The connective relations between the clutch 54 and the first shaft 51 and the operations between the clutch 54, the first gear 55 and the second gear 56 are illustrated later.

Moreover, the feeding gear 37 of the auto document feeder 30 is located at a side of the first gear 55 and coupled to the first gear 55. The feeding gear 37 is fixed at a side of the second shaft 36, while the second shaft 36 connects with the auto document feeder 30, and is capable of driving the pickup arm 31 of the auto document feeder 30 to rotate and to swing. However, the mechanism in other preferred embodiments of the present invention utilized to transmit the driving power is not limited to the combination of the feeding gear and the second shaft since some of other conventional mechanisms commonly utilized to transmit the driving power in the conventional art are capable of being utilized to transmit the driving power of the first gear 55 to the auto document feeder 30 as well.

Furthermore, the scanning module gear 48 of the flatbed scanner 40 is located at a side of the second gear 56 and coupled to the second gear 56. In addition, the scanning module gear 48 connects with the flatbed scanner 40 and is capable of driving the scanning module 43 of the flatbed scanner 40 to shift horizontally, so as to process flatbed scanning. Similarly, the mechanism in other preferred embodiments of the present invention utilized to transmit the driving power is not limited to the scanning module gear since some of other conventional mechanisms commonly utilized to transmit the driving power in the conventional art are capable of being utilized to transmit the driving power of the second gear 56 to the flatbed scanner 40 as well.

Besides, in the present preferred embodiment, each one of the second gear 56 and the scanning module gear 48 is, for example but not limited to, a bevel gear.

Figure 4:
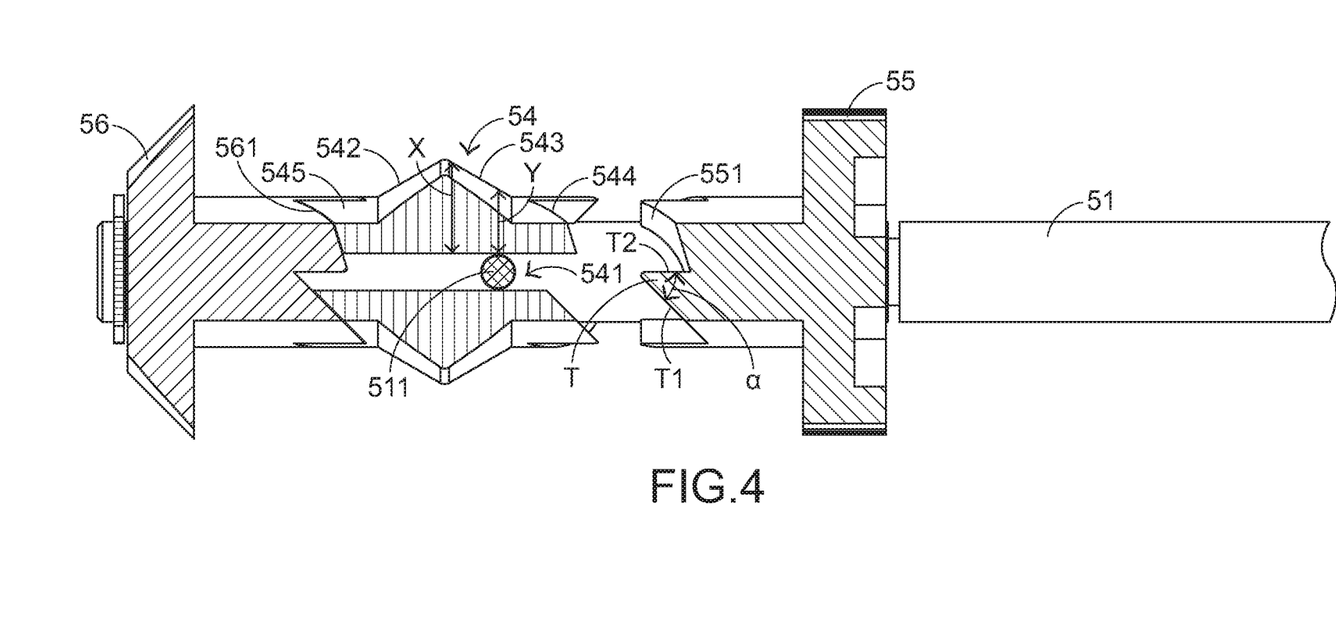
FIG. 4 illustrates a cross-sectional view of FIG. 3 along line C-C.

The connection relations between the clutch 54 and the first shaft 51 are illustrated as below in detail. Referring to FIG. 4, FIG. 4 illustrates a cross-sectional view of FIG. 3 along line C-C. As illustrated in FIG. 4, the first shaft 51 comprises a protrusion portion 511. Besides, the clutch 54 comprises a sliding tunnel 541, a first incline 542, a second incline 543, a first interference portion 544 and a second interference portion 545.

Here, the sliding tunnel 541 is disposed at an inner surface of the clutch 54, and a disposing orientation of the sliding tunnel 541 is parallel to the first shaft 51. Moreover, the protrusion portion 511 of the first shaft 51 radially disposed on the first shaft 51, and the protrusion portion 511 is disposed with the sliding tunnel 541 of the first shaft 51, so as to enable the clutch 54 to horizontally shift relative to the first shaft 51. As a result, when the first shaft 51 rotates, the protrusion portion 511 of the first shaft 51 pushes a side wall of the sliding tunnel 541, so as to synchronously bring the clutch 54 to rotate along the same rotation direction.

In the present preferred embodiment, the protrusion portion 511, for example but is not limited to, passes through the first shaft 51 and protrudes out of the first shaft 51. In other preferred embodiments, however, the first shaft 51 and the protrusion portion 511 can be formed as an integral part.

Moreover, both of the first incline 542 and the second incline 543 of the clutch 54 are disposed around an outer surface of the clutch 54, wherein the first incline 542 and the second incline 543 connects with each other, and a first distance X between the side of the first incline 542 adjacent to the second incline 543 and the inner surface of the clutch 54 is larger than a second distance Y between the side of the first incline 542 distant from the second incline 543 and the inner surface of the clutch 54. Besides, the first interference portion 544 and the second interference portion 545 of the clutch 54 are disposed at two opposite sides of the clutch 54 and capable of coupling with the first gear 55 and the second gear 56 respectively.

Also, as illustrated in FIG. 4, the first gear 55 comprises a third interference portion 551, and the second gear 56 comprises a fourth interference portion 561, wherein the third interference portion 551 of the first gear 55 is capable of coupling to the first interference portion 544 of the clutch 54, while the fourth interference portion 561 of the second gear 56 is capable of coupling to the second interference portion 545 of the clutch 54.

In the present preferred embodiment, each one of the first interference portion 544 and the second interference portion 545 of the clutch 54, the third interference portion 551 of the first gear 55, and the fourth interference portion 561 of the second gear 56 comprises a plurality of teeth T. Any one of the teeth T has a longer edge T1 and a shorter edge T2, wherein a length of the longer edge T1 is longer than a length of the shorter edge T2, and an acute angle α is formed between the longer edge T1 and the shorter edge T2. In the present preferred embodiment, a shape of each one of the teeth T is, for example but not limited to triangle.

Figure 5:
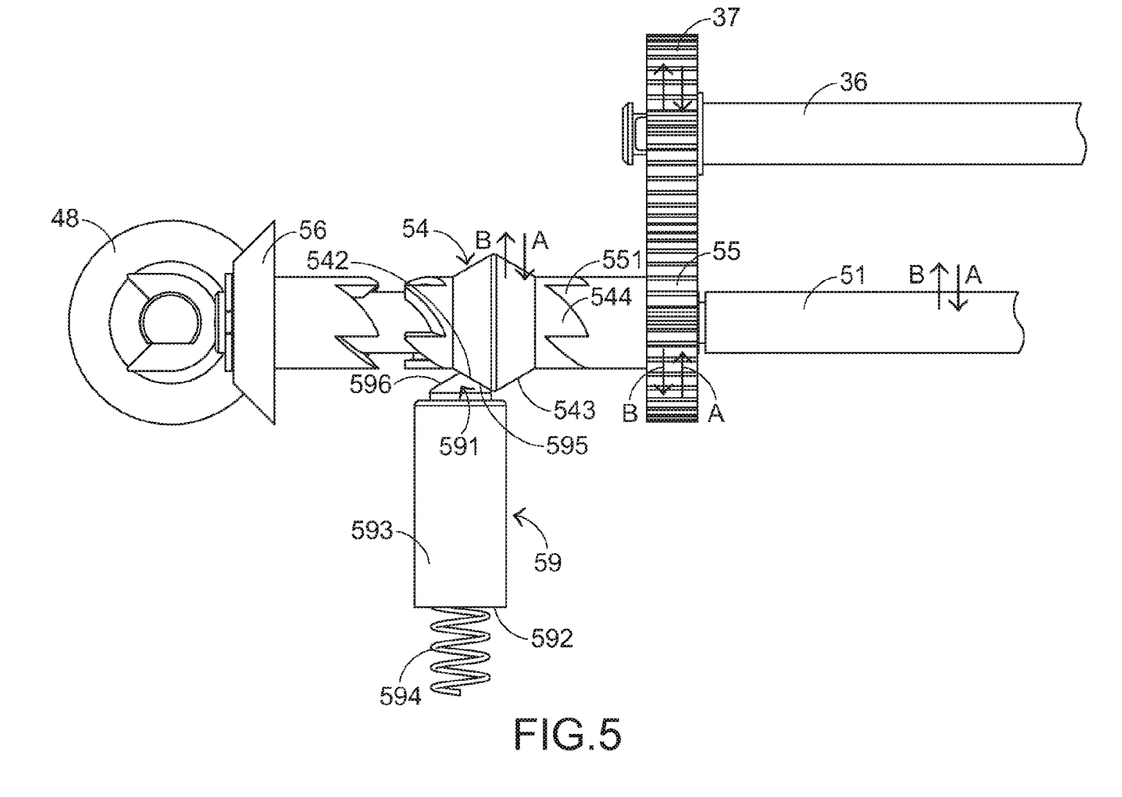
FIG. 5 illustrates a top view of a power-switching mechanism according to a preferred embodiment of the present invention.

The operations between the clutch 54, the first gear 55, the second gear 56 and the elastic limitation structure 59 are illustrated in detail as below. First, referring to FIG. 5, FIG. 5 illustrates a top view of a power-switching mechanism according to a preferred embodiment of the present invention. As shown in FIG. 5, the elastic limitation structure 59 comprises a push rod 593 and a spring 594, wherein the push rod 593 comprises a front end 591 and a rear end 592, and the front end 591 of the push rod 593 has a third incline 595 and a fourth incline 596. In addition, the spring 594 is disposed at a rear end 592 of the push rod 593, and capable of providing an elastic potential energy for returning the push rod 593.

Moreover, the front end 591 of the push rod 593 pushes the first incline 542 or the second incline 543 of the clutch 54, and is capable of leaning against the clutch 54 and thus locating the clutch 54, so as to enable the clutch 54 to connect with the first gear 55 or the second gear 56. In detail, the third incline 595 of the push rod 593 contacts with the first incline 542 of the clutch 54 when the front end 591 of the push rod 593 pushes the first incline 542 of the clutch 54. In contrast, the fourth incline 596 of the push rod 593 contacts with the second incline 543 of the clutch 54 when the front end 591 of the push rod 593 pushes the second incline 543 of the clutch 54.

In addition, referring to FIG. 3 and FIG. 5 together, as illustrated in FIG. 3 and FIG. 5, when the auto document feeder 30 of the sheet feed scanner 20 processes a document feeding scanning process, the power source 53 drives the first shaft 51 to rotate along the first direction A, and the first shaft 51 brings the clutch 54 to rotate along the first direction A as well.

As illustrated in FIG. 5, the third incline 595 of the elastic limitation structure 59 pushes the first incline 542 of the clutch 54, so as to enable the first interference portion 544 of the clutch 54 to continuously couple to the third interference portion 551 of the first gear 55. Therefore, the clutch 54 brings the first gear 55 to rotate along the first direction A, and further brings the feeding gear 37 to rotate. As illustrated in FIG. 3, the rotated feeding gear 37 drives the pickup arm 31 to rotate along the first direction A and to move downward, so as to enable the auto document feeder 30 to start to feed the document for processing the document feeding scanning process.

Figure 6:
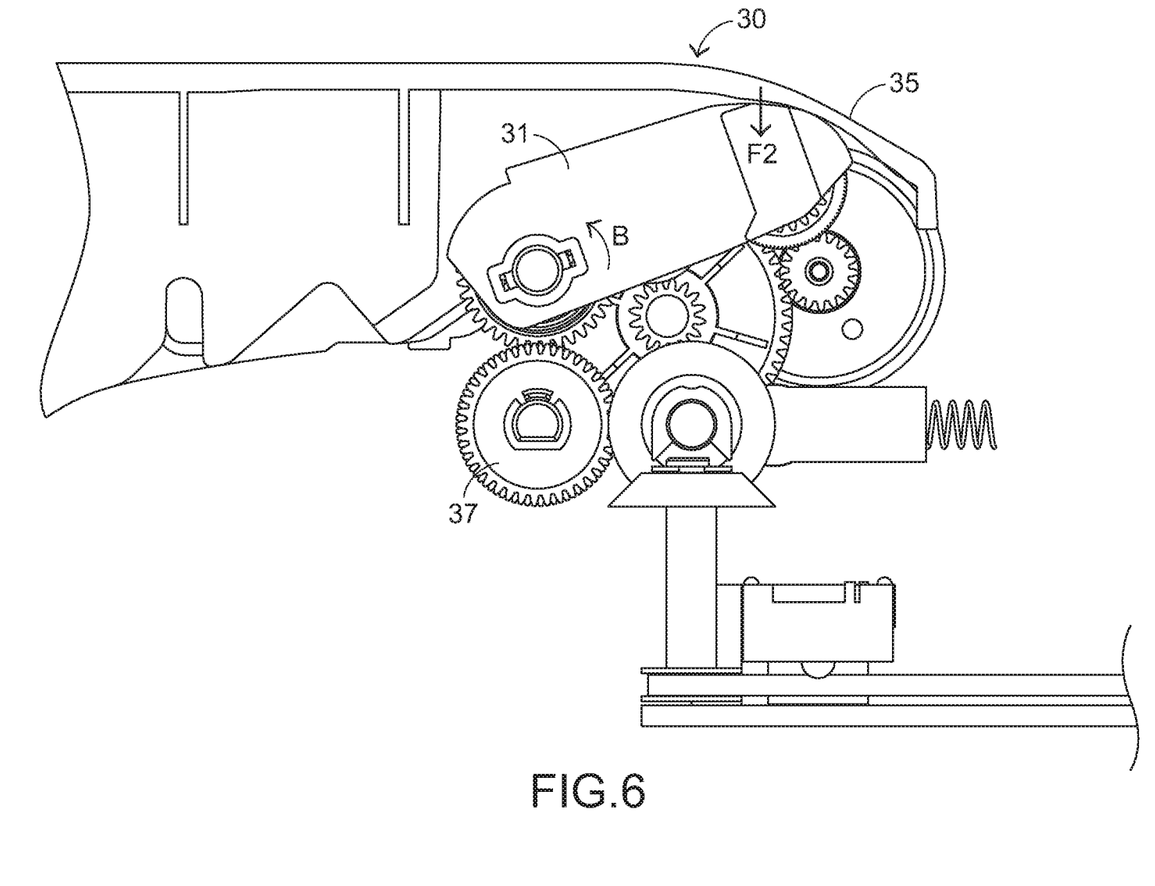
FIG. 6 illustrates a schematic view of a sheet feed scanner in a first motion according to a preferred embodiment of the present invention.

Referring to FIG. 3 and FIG. 5 as well, the power source 53 drives the first shaft 51 to rotate along the second direction B, and the first shaft 51 brings the clutch 54 to rotate along the second direction B when the flatbed scanner 40 of the sheet feed scanner 20 is operated to process a flatbed scanning process. As illustrated in FIG. 5, the third incline 595 of the elastic limitation structure 59 continuously pushes the first incline 542 of the clutch 54, so as to enable the first interference portion 544 of the clutch 54 to couple to the third interference portion 551 of the first gear 55. As a result, the clutch 54 brings the first gear 55 to rotate along the second direction B, and further brings the feeding gear 37 to rotate. Referring to FIG. 6, FIG. 6 illustrates a schematic view of a sheet feed scanner in a first motion according to a preferred embodiment of the present invention. As illustrated in FIG. 6, the rotated feeding gear 37 drives the pickup arm 31 to rotate along the second direction B and to move upward, so as to disable the auto document feeder 30 from feeding the document.

Figure 7:
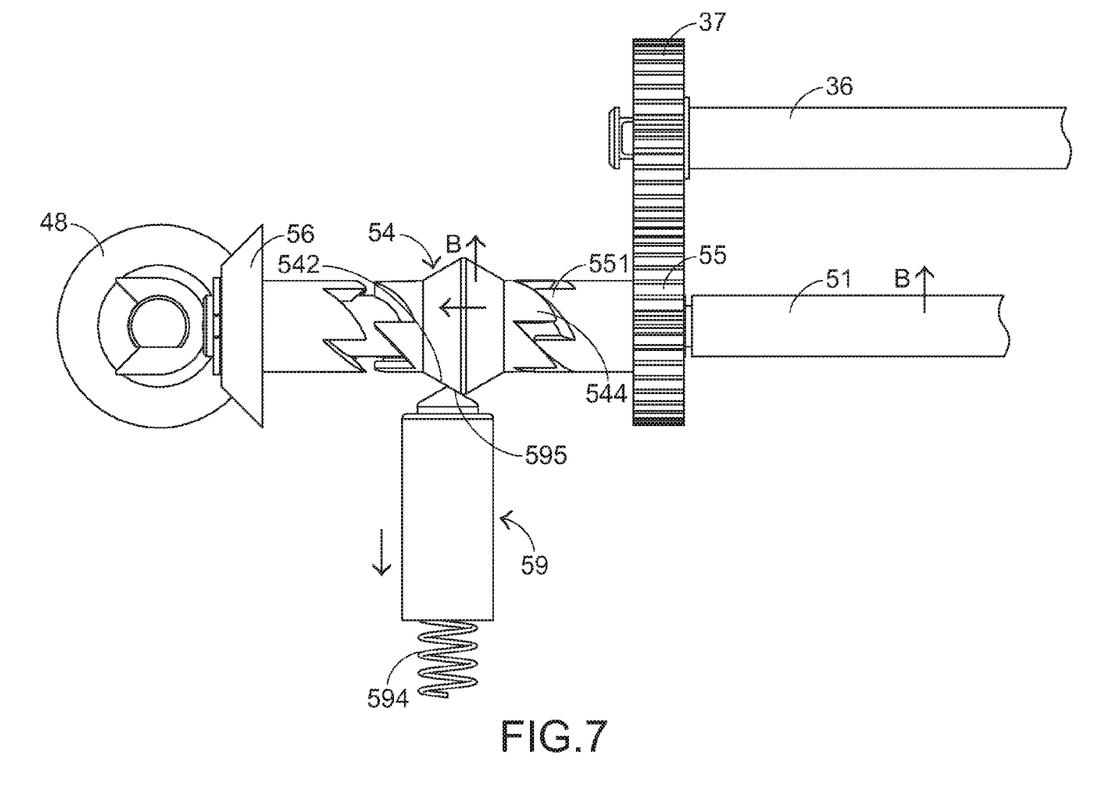
FIG. 7 illustrates a schematic view of a power-switching mechanism in a first motion according to a preferred embodiment of the present invention.

Referring to FIG. 6 and FIG. 7 together, wherein FIG. 7 illustrates a schematic view of a power-switching mechanism in a first motion according to a preferred embodiment of the present invention. As illustrated in FIG. 6, when the pickup arm 31 moves upward to contact with the lower surface of the top cover 35, the top cover 35 generates a second reaction force F2 to the pickup arm 31, so as to disable the feeding gear 37 from rotating. As a result, as illustrated in FIG. 7, the first gear 55 stops rotating as well since the feeding gear 37 stops rotating. Hence, the first interference portion 544 of the clutch 54 pushes the third interference portion 551 of the first gear 55 and the first gear 55 generates a reaction force to the clutch 54 since the first gear 55 stops rotating but the first shaft 51 still brings the clutch 54 to rotate along the second direction B, so as to enable the clutch 54 to shift toward the second gear 56. Next, the first incline 542 of the clutch 54 slides along the third incline 595 of the elastic limitation structure 59, and the clutch 54 pushes the elastic limitation structure 59, so as to enable the spring 594 of the elastic limitation structure 59 to generate an elastic potential energy.

Figure 8:
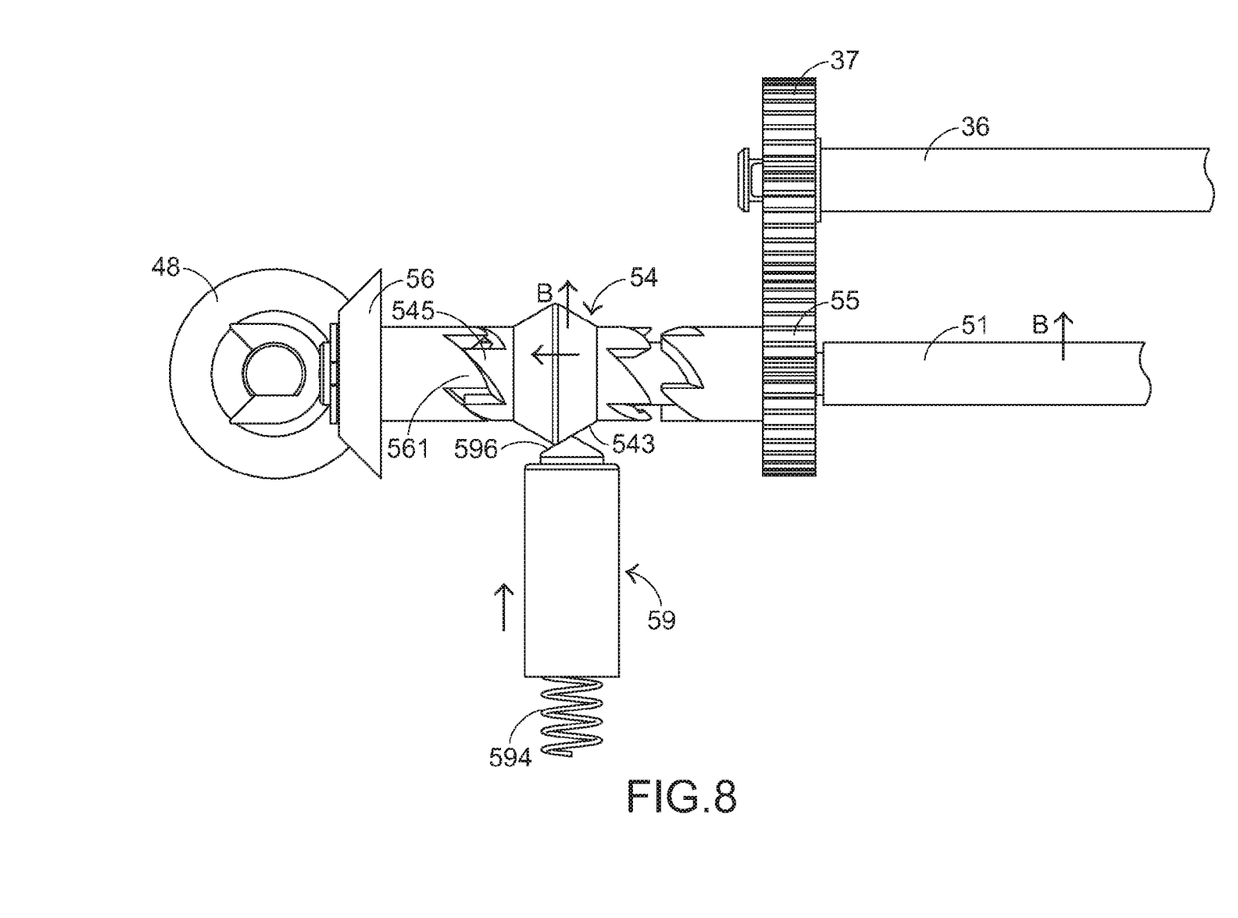
FIG. 8 illustrates a schematic view of a power-switching mechanism in a second motion according to a preferred embodiment of the present invention.

Referring to FIG. 8 continuously, wherein FIG. 8 illustrates a schematic view of a power-switching mechanism in a second motion according to a preferred embodiment of the present invention. As illustrated in FIG. 8, after that, when the clutch 54 continuously shifts toward the second gear 56, the second incline 543 of the clutch 54 will contact with the fourth incline 596 of the elastic limitation structure 59, so as to enable the spring 594 of the elastic limitation structure 59 to release the elastic potential energy. Afterward, the fourth incline 596 of the elastic limitation structure 59 will push the second incline 543 of the clutch 54, so as to enable the second interference portion 545 of the clutch 54 to couple to the fourth interference portion 561 of the second gear 56.

Figure 9:
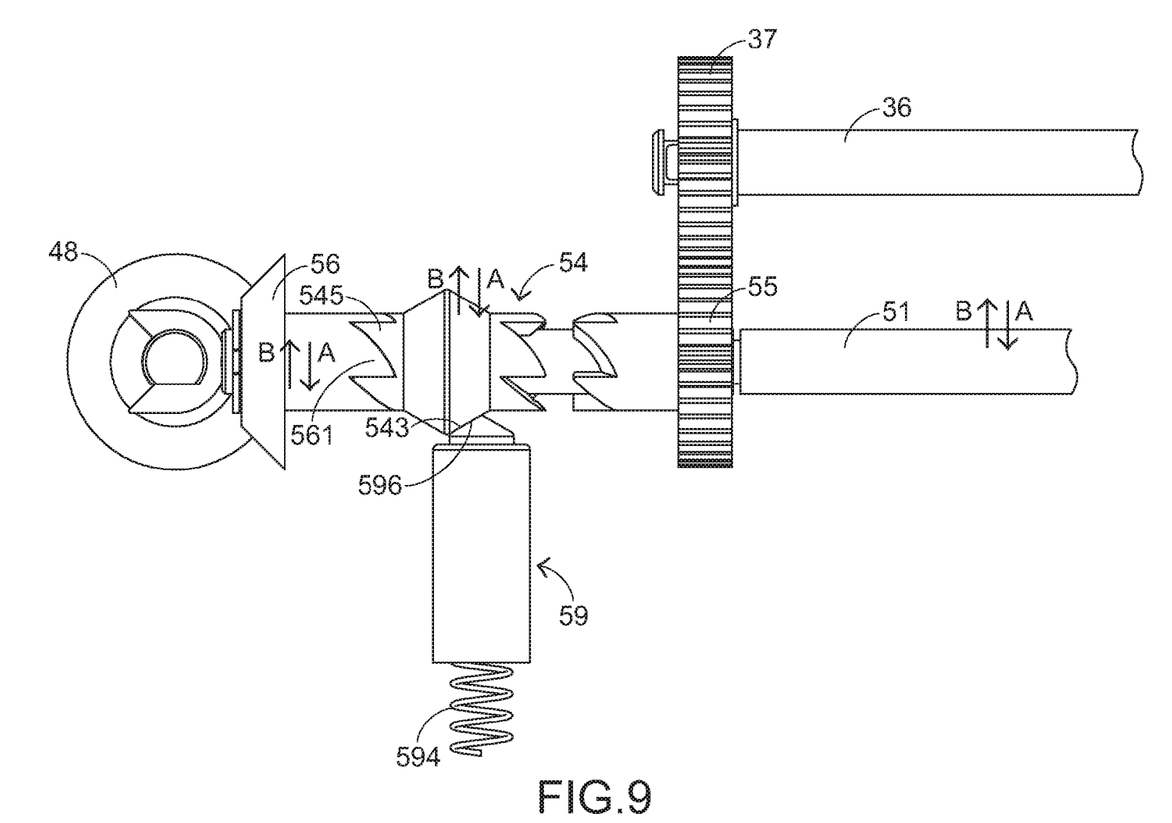
FIG. 9 illustrates a schematic view of a power-switching mechanism in a third motion according to a preferred embodiment of the present invention.

Referring to FIG. 3 and FIG. 9 together, wherein FIG. 9 illustrates a schematic view of a power-switching mechanism in a third motion according to a preferred embodiment of the present invention. Thereafter, as illustrated in FIG. 9, the second interference portion 545 of the clutch 54 couples to the fourth interference portion 561 of the second gear 56, and the elastic limitation structure 59 pushes the clutch 54, so as to enable the clutch 54 to engage with the second gear 56 continuously. Then, as illustrated in FIG. 3, the clutch 54 brings the second gear 56 to rotate along the second direction B, and thus the second gear 56 brings the scanning module gear 48 to rotate, so as to drive the transmission mechanism 44 to bring the scanning module 43 to move from a side to another side of the scanning platform 42, i.e. the flatbed scanner 40 is activated to process the flatbed scanning process.

Next, after the scanning module 43 reaches another side of the scanning platform 42, the scanning module 43 is transmitted to the initial position. As a result, the power source 53 rotates along the first direction A instead, and thus drives the first shaft 51 to bring the clutch 54 to rotate along the first direction A.

As illustrated in FIG. 9, the fourth incline 596 of the elastic limitation structure 59 pushes the second incline 543 of the clutch 54, so as to enable the second interference portion 545 of the clutch 54 to continuously couple to the fourth interference portion 561 of the second gear 56. Thereafter, the clutch 54 drives the second gear 56 to bring the scanning module gear 48 to rotate, so as to drive the transmission mechanism 44 to bring the scanning module 43 to move from the another side to the side of the scanning platform 42.

If the flatbed scanner 40 continuously processes the flatbed scanning process after the document is completely scanned, for example there is still another document put on the scanning platform 42, the power source 53 will rotate along the second direction B again. As illustrated in FIG. 9, the clutch 54 brings the second gear 56 to rotate along the second direction B, and thus the second gear 56 brings the scanning module gear 48 to drive the transmission mechanism 44 to move the scanning module 43 from the side to the another side of the scanning platform 42, i.e. the flatbed scanner 40 is activated to process the flatbed scanning process again.

In contrast, if the flatbed scanner 40 no more needs to process the flatbed scanning process after the document is completely scanned, the power source 53 will not drive the first shaft 511 to rotate. However, the power source 53 will continuously drives the first shaft 511 to rotate along the first direction A when the auto document feeder 30 of the sheet feed scanner 20 still needs to process the document feeding scanning process.

Figure 10:
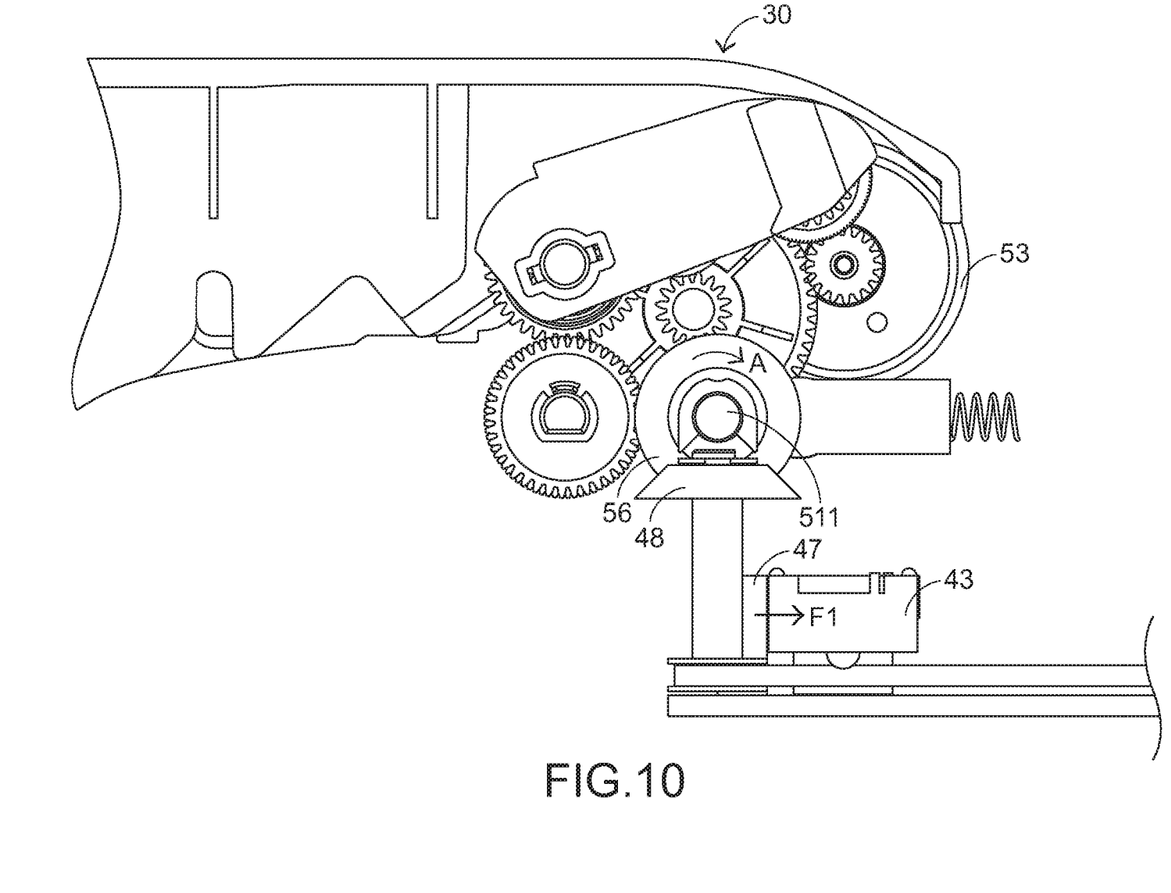
FIG. 10 illustrates a schematic view of a sheet feed scanner in a second motion according to a preferred embodiment of the present invention.
Figure 11:
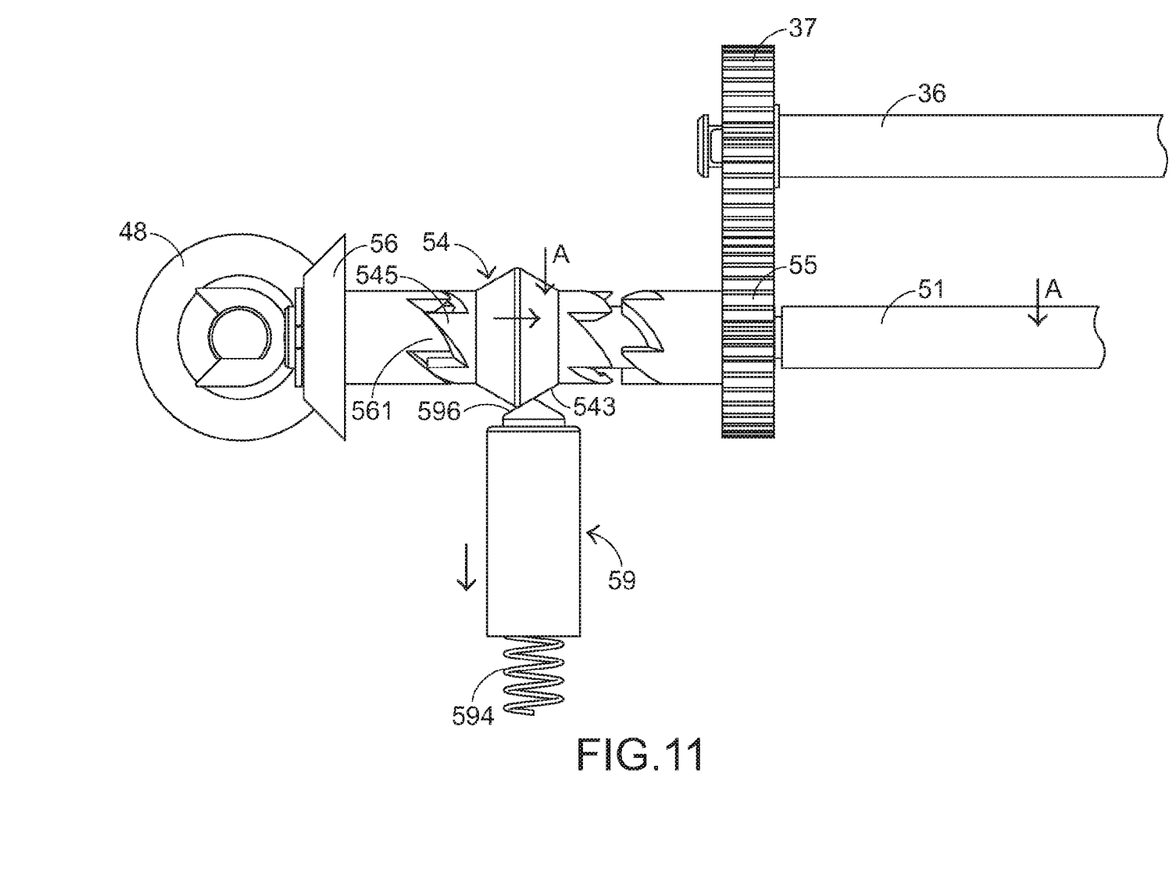
FIG. 11 illustrates a schematic view of a power-switching mechanism in a fourth motion according to a preferred embodiment of the present invention.

Referring to FIG. 10 and FIG. 11 together, FIG. 10 illustrates a schematic view of a sheet feed scanner in a second motion according to a preferred embodiment of the present invention, while FIG. 11 illustrates a schematic view of a power-switching mechanism in a fourth motion according to a preferred embodiment of the present invention. As shown in FIG. 10, if the power source 53 continuously drives the first shaft 511 to rotate along the first direction, the stopping structure 47 generates a first reaction force F1 to the scanning module 43 when the scanning module 43 is returned to the initial position and contacts with the stopping structure 47, so as to enable the scanning module gear 48 to stop rotating, and thus to stop the second gear 56 rotating.

Besides, as illustrated in FIG. 11, the second interference portion 545 of the clutch 54 pushes the fourth interference portion 561 of the second gear 56 when the second gear 56 stops rotating but the first shaft 51 still brings the clutch 54 to rotate along the first direction A, so as to enable the clutch 54 to shift toward the first gear 55. After that, the second incline 543 of the clutch 54 slides along the fourth incline 596 of the elastic limitation structure 59 and the clutch 54 pushes the elastic limitation structure 59, so as to enable the spring 594 of the elastic limitation structure 59 to generate an elastic potential energy.

Figure 12:
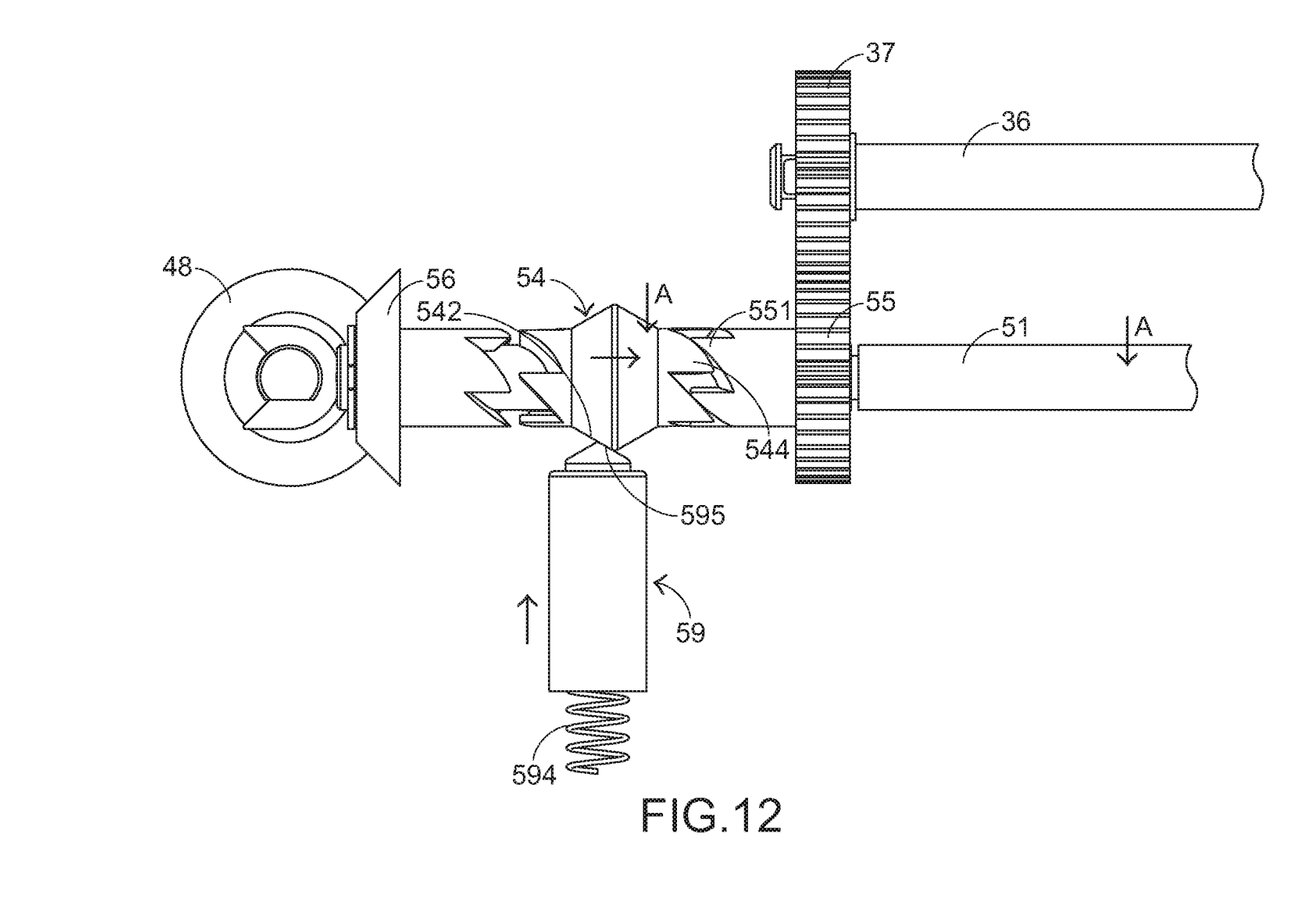
FIG. 12 illustrates a schematic view of a power-switching mechanism in a fifth motion according to a preferred embodiment of the present invention.

Moreover, referring the FIG. 3 and FIG. 12 together, wherein FIG. 12 illustrates a schematic view of a power-switching mechanism in a fifth motion according to a preferred embodiment of the present invention. As illustrated in FIG. 12, the first incline 542 of the clutch 54 contacts with the third incline 595 of the elastic limitation structure 59 when the clutch 54 continuously shifts toward the first gear 55, so as to enable the spring 594 of the elastic limitation structure 59 releases the elastic potential energy. As a result, the third incline 595 of the elastic limitation structure 59 pushes the first incline 542 of the clutch 54, so as to enable the first interference portion 544 of the clutch 54 to couple to the third interference portion 551 of the first gear 55.

Next, as illustrated in FIG. 5, the first interference portion 544 of the clutch 54 will couple to the third interference portion 551 of the first gear 55, and the elastic limitation structure 59 will push the clutch 54, so as to enable the clutch 54 to continuously engage with the first gear 55. As a result, the clutch 54 will bring the first gear 55 to rotate along the first direction A, and thus bring the feeding gear 37 to rotate. As illustrated in FIG. 3, the rotated feeding gear 37 drives the pickup arm 31 to rotate along the first direction A and to move downward, so as to enable the auto document feeder 30 to start to feed the document for processing the document feeding scanning process.

Figure 13:
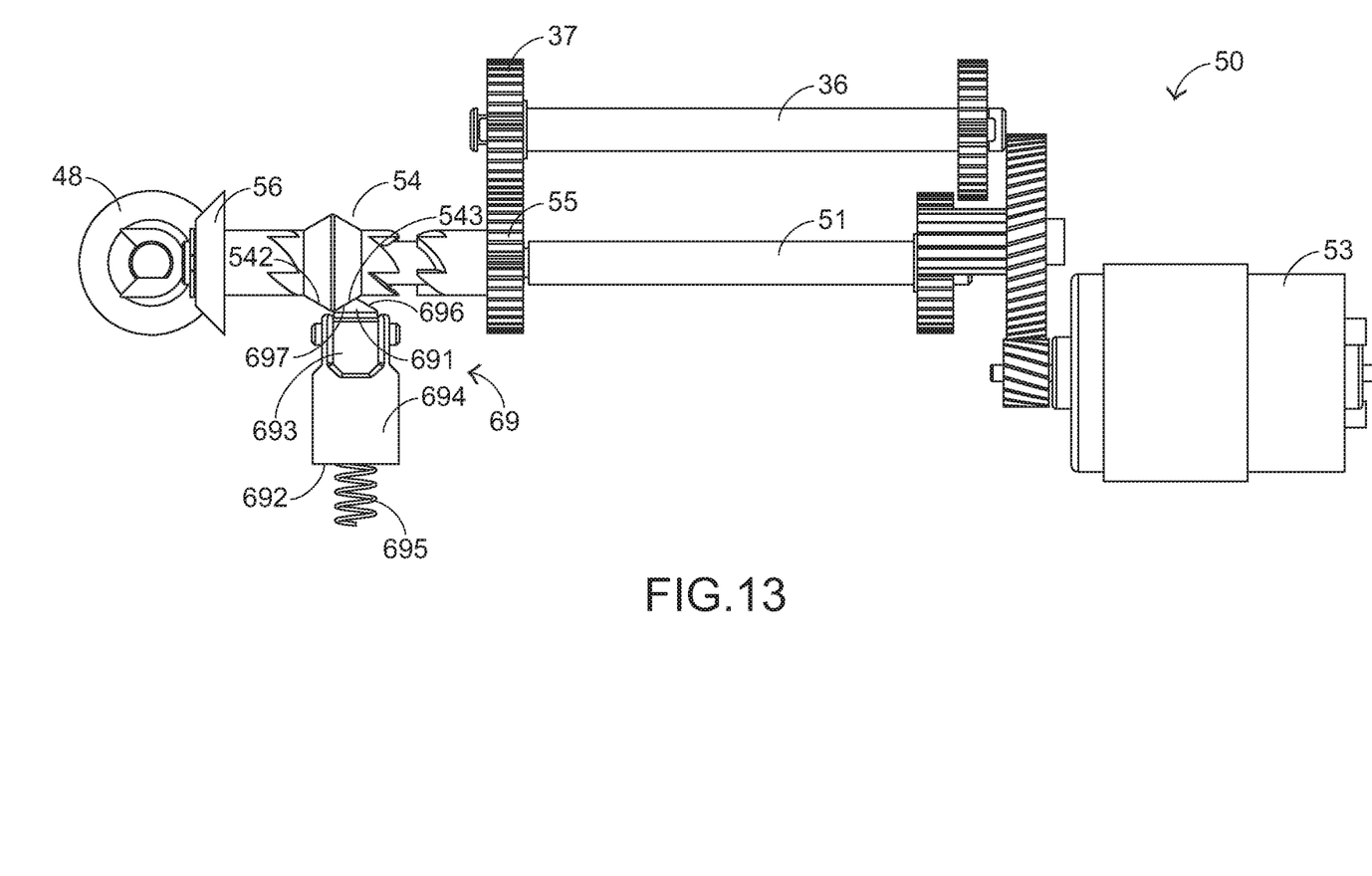
FIG. 13 illustrates a schematic view of a power-switching mechanism according to a second preferred embodiment of the present invention.

Furthermore, a second preferred embodiment of the present invention is illustrated as below. Referring to FIG. 13, FIG. 13 illustrates a schematic view of a power-switching mechanism according to a second preferred embodiment of the present invention. As illustrated in FIG. 13, the power-switching mechanism 50 comprises a first shaft 51, a power source 53, a clutch 54, a first gear 55, a second gear 56 and an elastic limitation structure 69. In addition, the elastic limitation structure 69 comprises a pressure roller 693, a holding rod 694 and a spring 695, wherein the holding rod 694 comprises a front end 691 and a rear end 692.

Moreover, the pressure roller 693 is fixed to the front end 691 of the holding rod 694. In contrast, the spring 695 is disposed to the rear end 692 of the holding rod 694, and capable of providing an elastic potential energy for returning the holding rod 694. In addition, the pressure roller 693 has a third incline 696 and a fourth incline 697, pushes the first incline 542 or the second incline 543 of the clutch 54, and capable of leaning against the clutch 54 and locating the clutch 54, so as to enable the clutch 54 to connect with the first gear 55 or the second gear 56. As a result, the third incline 696 of the pressure roller 693 contacts with the first incline 542 of the clutch 54 when the pressure roller 693 pushes the first incline 542 of the clutch 54. In contrast, the fourth incline 697 of the pressure roller 693 contacts with the second incline 543 of the clutch 54 when the pressure roller 693 pushes the second incline 543 of the clutch 54. In another word, the second preferred embodiment of the present invention is almost the same as the first preferred embodiment as illustrated in FIG. 3, except the elastic limitation structure. As a result, the operation steps of the second preferred embodiment are substantially the same as those of the first preferred embodiment as illustrated in FIG. 5 to FIG. 10 and thus are omitted herein.

Based on the descriptions of the preferred embodiments illustrated above, it should be understood that the present invention uses the clutch fitting onto the first shaft to switch between transmitting the driving power to the auto document feeder and transmitting the driving power to the flatbed scanner, and is capable of achieving the purples of pushing the clutch or locating the clutch by operating the third inline or the fourth incline of the elastic limitation structure to contact with the first incline or the second incline of the clutch based on different conditions and requirements. In another word, by using the power-switching mechanism to switch between transmitting the driving power to the auto document feeder and transmitting the driving power to the flatbed scanner, the present invention not only can leave out the cost of disposing an additional power source and decrease the cost of disposing the sheet feed scanner, but also reduce a total volume of the sheet feed scanner. In addition, the power-switching mechanism of the present invention is much easier to be assembled and maintained since not only the components included therein are much fewer but also the operations thereof are much simpler.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A sheet feed scanner, capable of scanning a document, wherein the sheet feed scanner comprises:
   an automatic document feeder, capable of feeding the document, wherein the automatic document feeder comprises;
   a top cover;
   a pickup arm, disposed under the top cover and capable of swinging relative to the top cover, so as to feed the document into the auto document feeder; and
   a feeding gear, connecting with the pickup arm;
   a flatbed scanner, disposed under the auto document feeder, and capable of scanning the document, wherein the flatbed scanner comprises:
   a scanning module, capable of reading an image of the document;
   a scanning module gear, connecting with the scanning module; and
   a stopping structure, capable of stopping the scanning module from moving; and
   a power-switching mechanism, capable of transmitting a driving power to the auto document feeder or the scanning module, wherein the power-switching mechanism comprises:
   a first shaft, comprising a protrusion portion;
   a power source, capable of driving the first shaft to rotate;
   a clutch, fitting onto the first shaft, and comprising a sliding groove, a first incline and a second incline, wherein the protrusion portion is disposed to the sliding groove, so as to enable the clutch to shift relative to the first shaft;
   a first gear, fitting onto the first shaft, and disposed at a side of the clutch;
   a second gear, fitting onto the first shaft, and disposed at another side of the clutch; and
   an elastic limitation structure, pushing the first incline or the second incline of the clutch, wherein the stopping structure generates a first reaction force to the scanning module when the scanning module moves toward the stopping structure to contact with the stopping structure, so as to enable the clutch to disengage from the second gear, while the top cover generates a second reaction force to the pickup arm when the pickup arm swings upward to contact with the top cover, so as to enable the clutch to disengage from the first gear.

2. The sheet feed scanner as claimed in claim 1, wherein the power source is a motor.

3. The sheet feed scanner as claimed in claim 1, wherein the elastic limitation structure comprises a push rod and a spring, and the spring is disposed at a rear end of the push rod.

4. The sheet feed scanner as claimed in claim 1, wherein the elastic limitation structure comprises a pressure roller, a holding rod and a spring, the pressure roller passes through a front end of the holding rod, and the spring is disposed at a rear end of the holding rod.

5. The sheet feed scanner as claimed in claim 1, wherein the feeding gear is coupled to the first gear when the elastic limitation structure pushes the first incline of the clutch, while the scanning module gear is coupled to the second gear when the elastic limitation structure pushes the second incline of the clutch.

6. The sheet feed scanner as claimed in claim 5, wherein each one of the second gear and the scanning module gear is a bevel gear.

7. The sheet feed scanner as claimed in claim 1, wherein the clutch further comprises a first interference portion and a second interference portion, the first gear comprises a third interference portion, the second gear comprises a fourth interference portion, the first interference portion of the clutch is coupled to the third interference portion of the first gear, and the second interference portion of the clutch is coupled to the fourth interference portion of the second gear.

8. The sheet feed scanner as claimed in claim 7, wherein each one of the first interference portion, the second interference portion, the third interference portion and the fourth interference portion comprises a plurality of teeth, each one of the teeth has a longer edge and a shorter edge, and an acute angle is formed by the longer edge and the shorter edge.

* * * * *